US007304451B2

(12) United States Patent
Morimoto et al.

(10) Patent No.: US 7,304,451 B2
(45) Date of Patent: Dec. 4, 2007

(54) MOTOR CONTROL APPARATUS AND METHOD FOR GENERATING MODULATION WAVE INSTRUCTION OF PWM INVERTER OF THE SAME MOTOR CONTROL APPARATUS

(75) Inventors: Shinya Morimoto, Fukuoka (JP); Akira Sasaki, Fukuoka (JP)

(73) Assignee: Kabushiki Kaisha Yasakawa Denki, Fukuoka (JP)

( * ) Notice: Subject to any disclaimer, the term of this patent is extended or adjusted under 35 U.S.C. 154(b) by 0 days.

(21) Appl. No.: 10/593,285

(22) PCT Filed: Mar. 16, 2005

(86) PCT No.: PCT/JP2005/004647

§ 371 (c)(1),
(2), (4) Date: Sep. 18, 2006

(87) PCT Pub. No.: WO2005/088822

PCT Pub. Date: Sep. 22, 2005

(65) Prior Publication Data

US 2007/0170885 A1 Jul. 26, 2007

(30) Foreign Application Priority Data

Mar. 17, 2004 (JP) ............................ 2004-076286

(51) Int. Cl.
*H02P 27/04* (2006.01)

(52) U.S. Cl. ...................... 318/811; 318/807; 318/805; 318/801; 318/810

(58) Field of Classification Search ................ 318/811, 318/801, 810, 805, 807
See application file for complete search history.

(56) References Cited

U.S. PATENT DOCUMENTS 4,099,109 A * 7/1978 Abbondanti ................ 318/811

(Continued)

FOREIGN PATENT DOCUMENTS

JP 6-253547 A 9/1994

(Continued)

OTHER PUBLICATIONS

Ahmet M. Hava et al., "Carrier-Based PWM-VSI Overmodulation Strategies: Analysis, Comparison, and Design", IEEE Transactions on Power Electronics, vol. 13, No. 4, pp. 674-689, (Jul. 1998).

*Primary Examiner*—Rita Leykin
(74) *Attorney, Agent, or Firm*—Sughrue Mion Pllc.

(57) ABSTRACT

A motor control apparatus capable of expanding a voltage output and a modulating wave signal generating method for a PWM inverter apparatus of the motor control apparatus, which is controlled by a pulse width modulating signal obtained by comparing a modulating wave signal of a voltage instruction with a carrier wave are provided.

An upper limit value calculation unit 105 and a modulation wave limiter unit 4 are provided, and an upper limit value 14 of a modulating wave, which is equal to or smaller than the maximum value of the carrier wave and equal to or larger than the minimum value of the carrier wave is produced in the upper limit value calculation unit 105 and modulating wave instructions 13 for a plurality of phases are corrected by the modulating wave control unit 4 by using the upper limit value 14 of the modulating wave.

21 Claims, 13 Drawing Sheets

1 300 6 11 16 10 2 12 3 13 4 15 5 14 105

U.S. PATENT DOCUMENTS 4,611,158 A * 9/1986 Nagase et al. .............. 318/803
5,475,293 A * 12/1995 Sakai et al. ................. 318/802
5,532,569 A * 7/1996 Tanamachi et al. ......... 318/802
5,614,803 A * 3/1997 Morioka et al. ............ 318/801
5,798,628 A * 8/1998 Fujita et al. ................ 318/805
6,678,180 B2 * 1/2004 Matsuda ..................... 363/132
7,064,514 B2 * 6/2006 Iwaji et al. ................. 318/801

FOREIGN PATENT DOCUMENTS

JP 9-140142 A 5/1997
JP 2000-341990 A 12/2000
JP 2001-157459 A 6/2001

* cited by examiner 300
16
5
15
105
4
14
13
3
12
11
2
10
6
1

MAXIMUM VALUE OF CARRIER WAVE
CARRIER WAVE
13
14
PWM OUTPUT
POSITIVE SIDE
NEGATIVE SIDE 91
92
PWM OUTPUT
POSITIVE SIDE
NEGATIVE SIDE

+Vs
851
85
852
81
80
S1
S2
DRIVE POWER SOURCE VOLTAGE
84

80
81
82
83
84
86
S1
S2
U PHASE CURRENT
V PHASE CURRENT

MOTOR CONTROL APPARATUS AND METHOD FOR GENERATING MODULATION WAVE INSTRUCTION OF PWM INVERTER OF THE SAME MOTOR CONTROL APPARATUS

TECHNICAL FIELD

The present invention relates to a method for generating a modulation wave instruction of a PWM inverter having negative side switching devices for limiting ON time of the negative side switching devices.

RELATED ART

The PWM inverter supplies electric power to a load by ON/OFF controlling switching devices thereof according to a PWM instruction, which is obtained by comparing a carrier wave with the modulation wave instruction.

FIG. 8 shows a general PWM inverter.

In FIG. 8, a reference numeral 80 depicts a PWM inverter, 81 a D.C. power source, 82 transistors (IGBT) as switching devices, 83 freewheel diodes and 84 a switching device drive circuit. A switch S1 is constructed with one of the transistors (IGBT) and one of the freewheel diodes, which is connected in reverse parallel to the transistor (IGBT). A switch S1 and a switch S2 connected in series with the switches S1, S2 are used as paired switching devices for one phase, so that three phase construction includes three pairs of the switches.

In the PWM inverter apparatus 80, an output of each phase is obtained by the switch S1 connected to a positive side of the D.C. power source and the switch S2 connected in series with the switch S1 and to a negative side of the D.C. power source and outputs of a plurality of phases are obtained by connecting corresponding number of switch pairs in parallel. A pulse voltage is generated by driving the positive side switching device and the negative side switch element and supplies power to a load.

FIG. 9 shows a conventional art procedure for producing the PWM instruction.

In FIG. 9, a reference numeral 91 depicts a carrier wave (triangular wave) and a reference numeral 92 depicts a modulation wave instruction (sinusoidal wave). As shown in FIG. 9, a positive side PWM signal and a negative side PWM signal are produced by producing a pulse signal by comparing the carrier wave 91 with the modulation wave instruction 92 and by inverting the pulse signal to producing an inverted pulse signal.

Further, since the D.C. power source is short-circuited when the positive and negative side switching devices in a same phase shown in FIG. 8 are turned ON simultaneously, a dead-time is provided in order to prevent the simultaneous turning ON of the switching devices. The modulation wave instruction is produced such that a voltage corresponding to the voltage instruction is outputted in general.

In producing the modulation wave instruction, it is possible without distortion to output an A.C. signal having effective value up to $1/\sqrt{2}$ (about 0.71) times a power source voltage when the modulation wave is produced by utilizing a method for superposing third harmonic wave component of an output frequency or the so-called space vector modulation method.

FIG. 10 shows an example of 3-phase A.C. modulation wave produced by the space vector method. Although the waveform of each phase is not continuous, a difference between the waveforms of 2 phases becomes a sinusoidal wave.

There is a method in which all of voltages capable of being outputted by a 3-phase inverter, can be utilized by correcting a relation between modulation ratio and actually outputted modulation ratio with using the so-called over-modulation correction with which 6-step output become linear. An effective value of a basic wave component of the 6 step outputs becomes about 0.78 times the D.C. power source voltage (for example, refer to non-patent publication 1).

FIG. 11 shows a charge pump circuit for producing a switching device drive power source by utilizing a negative side pulse. In FIG. 11, a reference numeral 80 depicts the PWM inverter apparatus shown in FIG. 8 and a reference numeral 85 depicts the charge pump circuit. The charge pump circuit 85 is connected to the switching device drive circuit 84 through diodes 851 connected in forward direction to a second D.C. power source $+V_s$ and provided for respective phases and capacitors 852 provided for the respective phases.

In the PWM inverter apparatus including the charge pump circuit 85, a voltage of the capacitor is reduced when the negative side pulse is in OFF state, so that it becomes impossible to maintain a voltage high enough to drive the switching device. Since the minimum ON time of the negative side switching device at a carrier wave frequency is determined by the carrier wave frequency, modulation ratio is limited such that the pulse width can be maintained.

FIG. 12 shows a current detection circuit to which the method of this invention is applied.

In FIG. 12, a reference numeral 80 depicts the PWM inverter apparatus and a reference numeral 86 depicts shunt resistors respectively inserted between the negative side switches S2 and a negative side of the D.C. power source 81.

When the current detection circuit has the construction shown in FIG. 12, in which the output phase currents of the PWM inverter apparatus 80 are detected by the shunt resistors 86 between the negative side switches S2 and the negative side of the D.C. power source 81, the output current flows in the current detection portion only when the negative side switches S2 are in ON state, so that it is necessary to turn the negative side switch S2 ON with a timing of the current detection. Therefore, the pulse width is maintained by limiting modulation ratio.

Non-patent publication 1:

Ahmet M. Hava, Russel J. Kerkman, Thomas A. Lipo, Carrier-Based PWM-VSI Overmodulation Strategies: Analysis, Comparison, and Design, IEEE Transactions on Power Electronics, Vol. 13, No. 4, JULY 1998

DISCLOSURE OF THE INVENTION

Problem to be Solved by the Invention

In the modulation wave producing method according to the conventional art, there is a problem that the output voltage is limited since modulation ratio is limited when the charge pump circuit working as the drive power source of the switching device utilizes the negative side pulse as shown in FIG. 11 or the output phase current of the PWM inverter apparatus 80 is detected between the negative side switching devices and the negative side D.C. power source as shown in FIG. 12.

Further, when this is utilized for the motor control, there is a problem that, since induced voltage is increased with increase of rotation speed of the motor, the maximum rotation number of the motor is lowered by limiting voltage or torque of the motor at the maximum rotation number is limited.

This invention is made in view of these problems and an object of the present invention is to provide a motor control apparatus capable of expanding voltage output while maintaining the minimum pulse width of the negative side switching device and a method for producing the modulation wave instruction of the PWM inverter of the motor control apparatus.

Means for Solving the Problems

In order to solve the above problem, the present invention is characterized as below.

According to aspect 1 of the invention, there is provided a method for generating a modulation wave instruction of the PWM inverter apparatus, which is controlled by a pulse width modulation signal obtained by comparing a modulation wave signal of a voltage instruction with a carrier wave, the method including the steps of:

providing an upper limit value of modulation wave, which is equal to or smaller than the maximum value of the carrier wave and larger than the minimum value of the carrier wave; and correcting the modulation wave instructions of a plurality of phases so that the modulation wave instructions become between the minimum value of the carrier wave and the upper limit value of the modulation wave.

According to aspect 2 of the invention, there is provided the method for generating a modulation wave instruction of the PWM inverter apparatus as in aspect 1, wherein the modulation wave instructions are corrected to become between the minimum value of the carrier wave and the upper limit value of the modulation wave, after the modulation wave instruction of the plurality of phases is reduced by a difference between the maximum value of the carrier wave and the upper limit value of the modulation wave.

According to aspect 3 of the invention, there is provided the method for generating a modulation wave instruction of the PWM inverter apparatus as in aspect 2, wherein the modulation wave instructions of the plurality of phases are corrected so that a difference between the maximum value and the minimum value of the modulation wave instructions coincides with the difference between the minimum value of the carrier wave and the upper limit value of the modulation wave and so that a modulation ratio instruction coincides with an actual modulation ratio until all of the modulation wave instructions of the plurality of phases become the maximum value or the minimum value.

According to aspect 4 of the invention, there is provided the method for generating a modulation wave instruction of the PWM inverter apparatus including a charge pump circuit for charging a capacitor with pulse of a negative side switching device as a drive circuit power source of a switching device, as in any of aspects 1 to 3, wherein the upper limit value of the modulation wave is determined so that the pulse width of the negative side switching device at a frequency of the carrier wave becomes a pulse width necessary to maintain an output voltage of the charge pump circuit.

According to aspect 5 of the invention, there is provided the method for generating a modulation wave instruction of the PWM inverter apparatus as in aspect 4, wherein the upper limit value of the modulation wave has an initial value, when an output frequency is 0;

increases monotonously from the initial value with increase of the output frequency;

is limited to an upper limit of a minimum pulse width, when it exceeds the upper limit of the minimum pulse width required by a switching device; and is changed so that it coincides with the maximum value of the carrier wave, when the output frequency becomes high.

According to aspect 6 of the invention, there is provided a method for generating a modulation wave instruction of the PWM inverter apparatus as in any of aspects 1 to 3, wherein the output phase currents of the plurality of phases are detected between the negative side switching devices and the negative side of the D.C. power source; and the upper limit value of the modulation wave is determined so that the pulse width of the negative side switching device is maintained for a time long enough to detect the currents.

According to aspect 7 of the invention, there is provided a motor control apparatus including:

a voltage instruction producing unit for producing a voltage instruction on the basis of a current detection value and a current instruction;

a modulation wave instruction producing unit for producing a modulation wave instruction on the basis of the voltage instruction;

a PWM signal generator unit for generating a PWM signal obtained by comparing the modulation wave instruction with a carrier wave; and a PWM inverter apparatus controlled by the PWM signal;

a modulation wave upper limit value calculation unit for calculating an upper limit value of modulation wave so that the upper limit value of modulation wave becomes equal to or smaller than the maximum value of the carrier wave and larger than the minimum value of the carrier wave; and a modulating wave control unit for correcting the modulation wave instruction to be a value between the upper limit value of modulation wave and the minimum value of the carrier wave.

According to aspect 8 of the invention, there is provided the motor control apparatus as in aspect 7, wherein the modulation wave control unit corrects the modulation wave instruction to be a value between the upper limit value of the modulation wave and the minimum value of the carrier wave, after the modulation wave instruction is reduced by a difference between the maximum value of the carrier wave and the upper limit value of the modulation wave.

According to aspect 9 of the invention, there is provided the motor control apparatus as in aspect 8, wherein the modulation wave control unit adds an overmodulation correction for making a modulation ratio instruction coincident with an actual modulation ratio to the modulation wave instruction.

According to aspect 10 of the invention, there is provided a motor control apparatus as in any of aspects 7 to 9, including:

a charge pump circuit for obtaining a power source of a switching device drive circuit of the PWM inverter by charging a capacitor with a pulse of a negative side switching device; and a current detection unit for detecting the output phase currents of the plurality of phases between the negative side switching devices and the negative side of the D.C. power source, wherein the modulating wave upper limit value calculation unit calculates the upper limit value of modulating wave on the basis of a pulse width required for a switching device to be used, a pulse width required for maintaining an output voltage of the charge pump circuit or a pulse width required for current detection.

According to aspect 11 of the invention, there is provided the motor control apparatus as in aspect 10, wherein the modulation wave upper limit value calculation unit calculates the upper limit value of modulation wave so that the upper limit value of the modulation wave has an initial value, when an output frequency is 0;

increases monotonously from the initial value with increase of the output frequency;

is limited to an upper limit of a minimum pulse width when it exceeds the upper limit of the minimum pulse width required by a switching device; and is changed so that it coincides with the maximum value of the carrier wave, when the output frequency becomes high.

Advantage of the Invention

According to the invention defined in aspect 1 or 7, it is possible to output a voltage higher than that when the modulation ratio is limited, while maintaining the pulse width on the negative side.

According to the invention defined in aspect 2 or 8, it is possible to reduce voltage distortion when the A.C. voltage is outputted.

According to the invention defined in aspect 3 or 9, it becomes possible to utilize the voltage at maximum by adding the overmodulation correction.

According to the invention defined in aspect 4 or 10, it is possible, in the PWM inverter apparatus having, as the power source of the switching device drive circuit, the charge pump circuit for obtaining the power source of the switching device drive circuit by charging the capacitor with the pulse of the negative side switching device, to reliably maintain the pulse width of the negative side switching device.

According to the invention defined in aspect 5 or 11, it is possible to exclude limitation by the pulse width at high frequency and to exclude limitation of rotation speed and torque of the motor when voltage is increased with increase of frequency as in the motor control.

According to the invention defined in aspect 6 or 10, it is possible, in the PWM inverter apparatus for detecting the output phase currents of the plural phases between the negative side switching devices and the negative side of the D.C. power source, to reliably detect the currents at voltage outputs higher than that when modulation ratio is limited.

BRIEF DESCRIPTION OF THE DRAWINGS

FIG. 1 is a control block diagram showing an embodiment of the present invention.

FIG. 2 shows a procedure for producing a PWM instruction according to a method defined in aspect 1 of this invention.

FIG.4 shows a relation between a conventional modulation ratio and a practical modulation ratio.

FIG. 5 shows a relation between a conventional art modulation ratio and a practical modulation ratio according to the method of the present invention.

FIG. 6 shows a change of an amount of charge of a charge pump circuit.

FIG. 7 is a graph showing an upper limit of modulating wave, which is changed under consideration of a minimum switchable pulse width.

FIG. 8 shows an example of construction of a PWM inverter apparatus to which the method of the invention is applied.

FIG. 9 shows a procedure for producing a conventional art PWM instruction.

FIG. 10 shows an example of modulation. wave instruction according to the space vector method.

FIG. 11 shows a charge pump circuit to which the method of this invention is applied.

FIG. 12 shows a current detection circuit to which the method of this invention is applied.

FIG. 13 is a block diagram showing an embodiment of a motor control apparatus according to the present invention.

DESCRIPTION OF REFERENCE NUMERALS AND SIGNS

Figure 1:
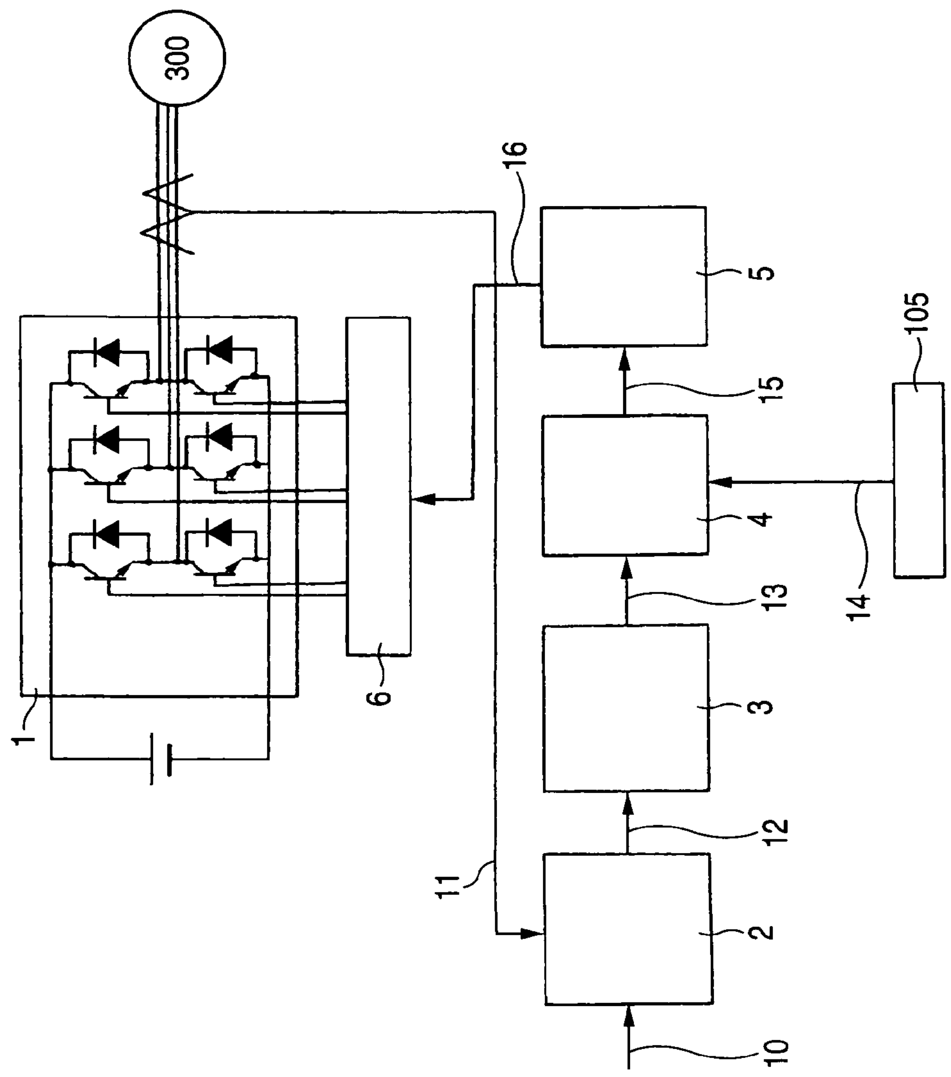
[FIG. 1]

1 PWM inverter apparatus
2 voltage instruction producing unit
3 modulation wave instruction producing unit
4 modulation wave control unit
5 PWM signal generator unit
6 switching device drive circuit
10 current instruction
11 current detection
12 voltage detection
13 modulation wave instruction
14 upper limit of modulation wave
15 limited modulation wave instruction
16 PWM signal
17 position feedback signal
80 PWM inverter apparatus
81 D.C. power source
82 switching device
83 freewheel diode
84 switching device drive circuit
85 charge pump circuit
86 shunt resistor
100 motor control apparatus
101 upper control unit
102 lower control unit
103 current detection unit
104 converter unit
105 modulation wave upper limit value calculation unit
200 commercial power source
300 motor
400 encoder

BEST MODE FOR CARRYING OUT THE INVENTION

A motor control apparatus of the present invention and a method for producing a modulation wave instruction of a PWM inverter of the motor control apparatus will be described in detail with reference to the drawings showing concrete embodiments thereof.

Embodiment 1

FIG. 1 is a control block diagram showing an embodiment of the present invention.

Functions of components of the block diagram shown in FIG. 1 will be described. A voltage instruction producing unit 2 produces a voltage instruction 12 on the basis of a current detection value 10 and a current instruction 11. A modulation wave instruction producing unit 3 produces a modulation wave instruction 13 such that a voltage instructed by the voltage instruction 12 is outputted by limiting the voltage instruction 12 when the latter is large. A modulation wave limiter unit 4 limits the modulation wave instruction 13 between a modulation wave upper limit value 14 and the minimum value of a carrier wave.

A modulation wave instruction 15 thus limited is compared with the carrier wave by a PWM signal generator unit 5 to provide a dead-time and outputs a PWM signal 16, so that power is supplied to a load by ON/OFF controlling the switching devices by the switching device drive circuit 6 of the PWM inverter apparatus 1.

Although not shown in FIG. 1, the voltage instruction is made coincident with actual voltage by performing a compensation corresponding to a portion of voltage, which is changed by the dead-time with respect to the voltage instruction or the modulation ratio instruction according to the current instruction, the current detection or a current estimation.

Now, the invention defined in aspect 1 will be described.

Figure 2:
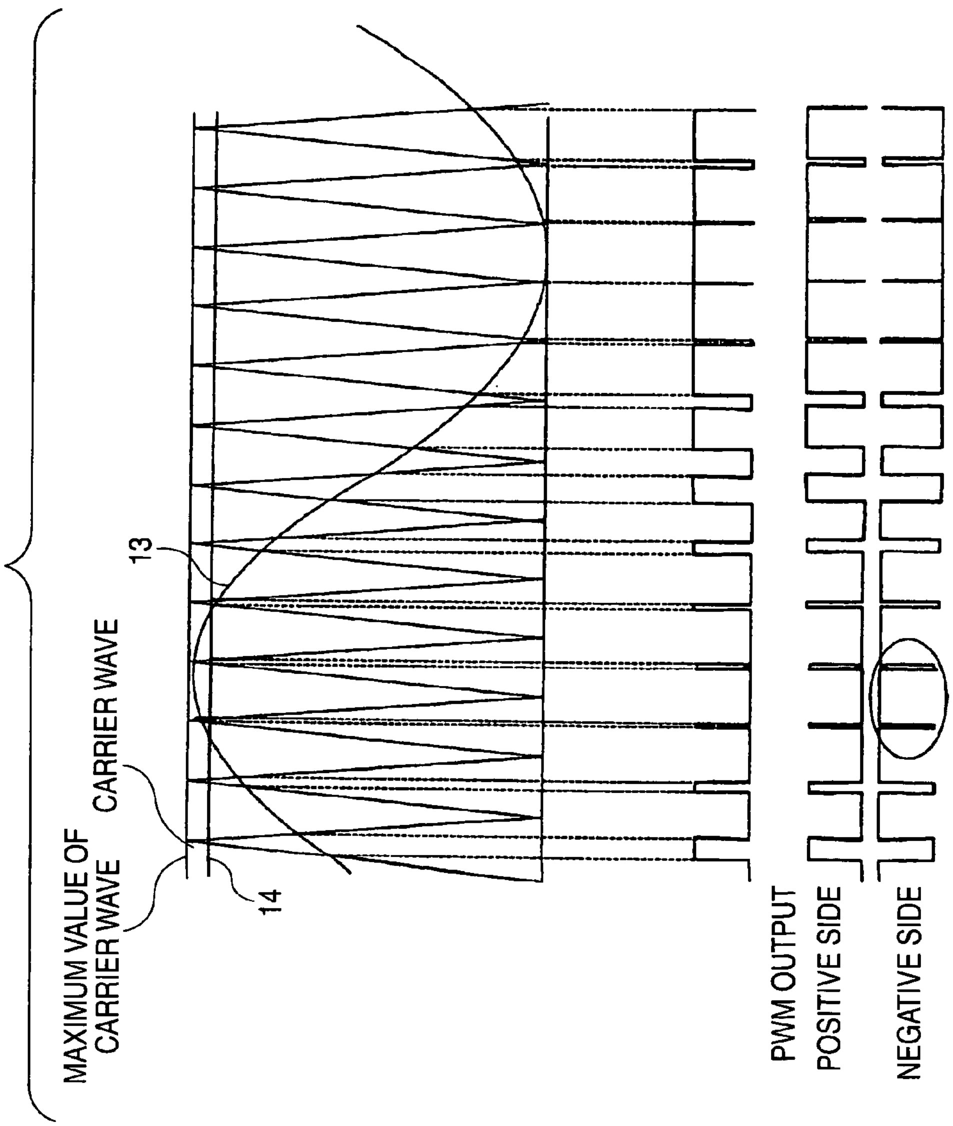
[FIG. 2]

By providing the modulation wave limitation unit as shown in FIG. 1, the PWM instruction shown in FIG. 2 is produced. That is, the negative side PWM instruction, which is circled in FIG. 2, can reliably maintain a certain width according to the upper limit value of modulation wave by providing the upper limit value of modulation wave, which is smaller than the maximum value of the carrier wave, and correcting the modulation wave instruction such that it becomes between the minimum value of the carrier and the upper limit value of the modulation wave.

Next, the invention defined in aspect 2 will be described.

Figure 3:
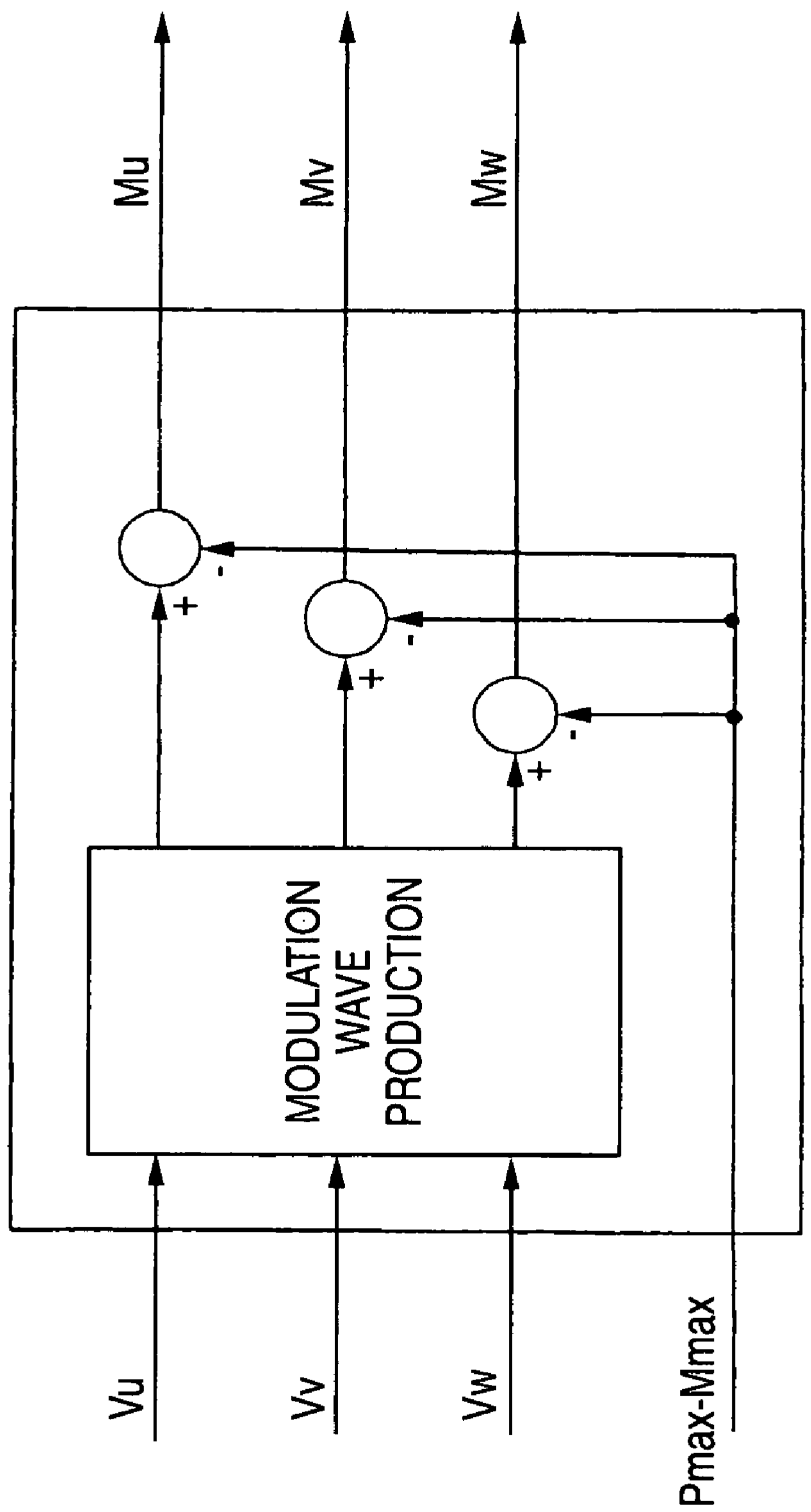
[FIG. 3] FIG.3 in a block diagram for producing a modulating wave instruction according to a method defined in aspect 2 of this invention.

When only the upper limit of modulation wave is limited, a distortion of the PWM instruction occurs. By reducing the modulation wave instruction of each phase by a difference between the maximum value Pmax of the carrier wave and the upper limit value Mmax of the modulation wave as shown in FIG. 3, a center of amplitude of the instruction becomes a center between the minimum value of the carrier wave and the upper limit value of the modulation wave, so that the distortion of the PWM instruction can be eliminated.

Further, the invention defined in aspect 3 will be described.

When a sinusoidal wave signal is used as the modulation wave instruction, the modulation ratio instruction coincides with an actual modulation ratio until the maximum value of the sinusoidal wave signal becomes coincident with the maximum value of the carrier wave. Assuming that modulation ratio when it becomes the maximum is 1.0, it is generally known that, by superimposing the third harmonic component of the output frequency thereon, the instruction and the actual value are coincident up to modulation ratio 1.15. The actual modulation ratio becomes the maximum when the modulation wave instruction in each phase, which is called as the 6-step, is either the maximum value or the minimum value modulation ratio and, in such case, the modulation ratio becomes about 1.27.

Figure 4:
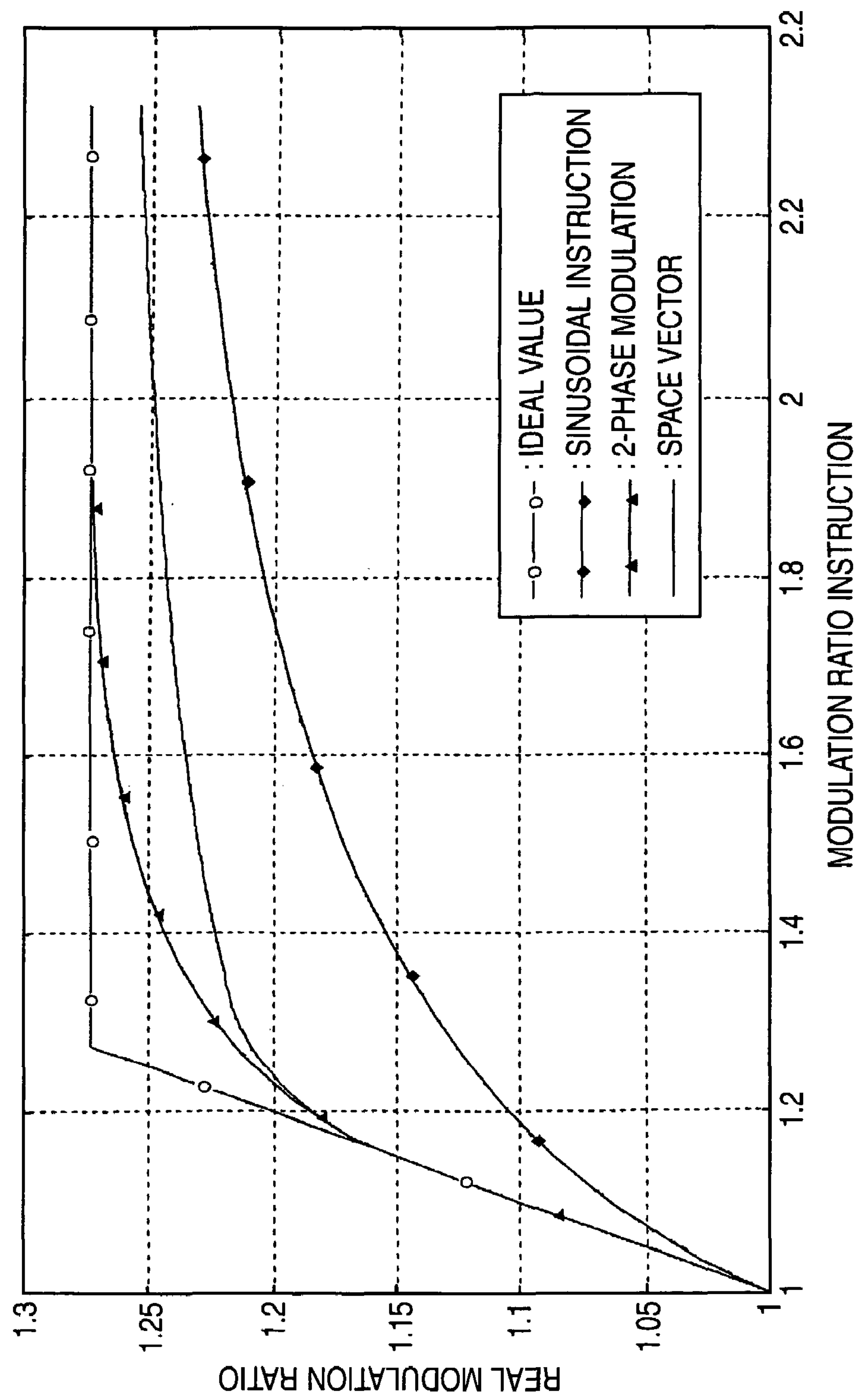
[FIG. 4]

However, when the modulation ratio exceeds 1.15, the relation between the modulation ratio instruction and the actual modulation ratio is not coincident as shown in FIG. 4, although it depends on the method for producing modulation wave. In FIG. 4, only modulation ratios equal to or larger than 1.0, with which the modulation ratio instruction and the actual modulation ratio are not coincident, are shown. In the case of 2-phase modulation shown in FIG. 4, the modulation ratio becomes maximum (6-step) when the modulation ratio instruction is about 2.3. From this relation, it is possible in the case of 2-phase modulation to make the modulation ratio instruction coincident with the actual modulation ratio up to modulation ratio 1.27 by multiplying inverse function of the function representing the curve in FIG. 4 when the modulation ratio exceeds 1.15.

This system is generally referred to as the overmodulation correction.

The overmodulation correction may be done by a method for adding a rectangular wave having the same polarity as that of the modulation wave instruction, instead of the method using the inverse function. According to the present invention, it is possible to output large voltage compared with that obtained by limiting modulation ratio, by performing a correction of the modulation wave similar to the overmodulation between the upper limit value of modulation wave and the minimum value of the carrier wave.

In the use of the present invention, the modulation wave is limited as described in aspect 1 or 2 in order to hold the pulse width.

A ratio Km of the difference between the upper limit value Mmax and the minimum value Pmin of the carrier wave to the difference between the maximum value Pmax and the minimum value Pmin of the carrier wave is represented by the following equation (1), so that the modulation ratio which can be outputted is reduced correspondingly to the ratio Km.

$$Km = \frac{M\max - P\min}{P\max - P\min} \qquad \text{[Equation 1]}$$

In the conventional method for limiting modulation ratio, both the upper and lower limits of modulation wave are limited. Therefore, the ratio is represented by the following equation (2).

$$Km' = \frac{M\max - P\min - (P\max - M\max)}{P\max - P\min} < Km \qquad \text{[Equation 2]}$$

In the case of the system of superimposition of the third harmonic wave or the space vector system, it is possible to output up to modulation ratio 1.15×Km', while, in the present invention, it is possible to output up to modulation ratio 1.27×Km.

Figure 5:
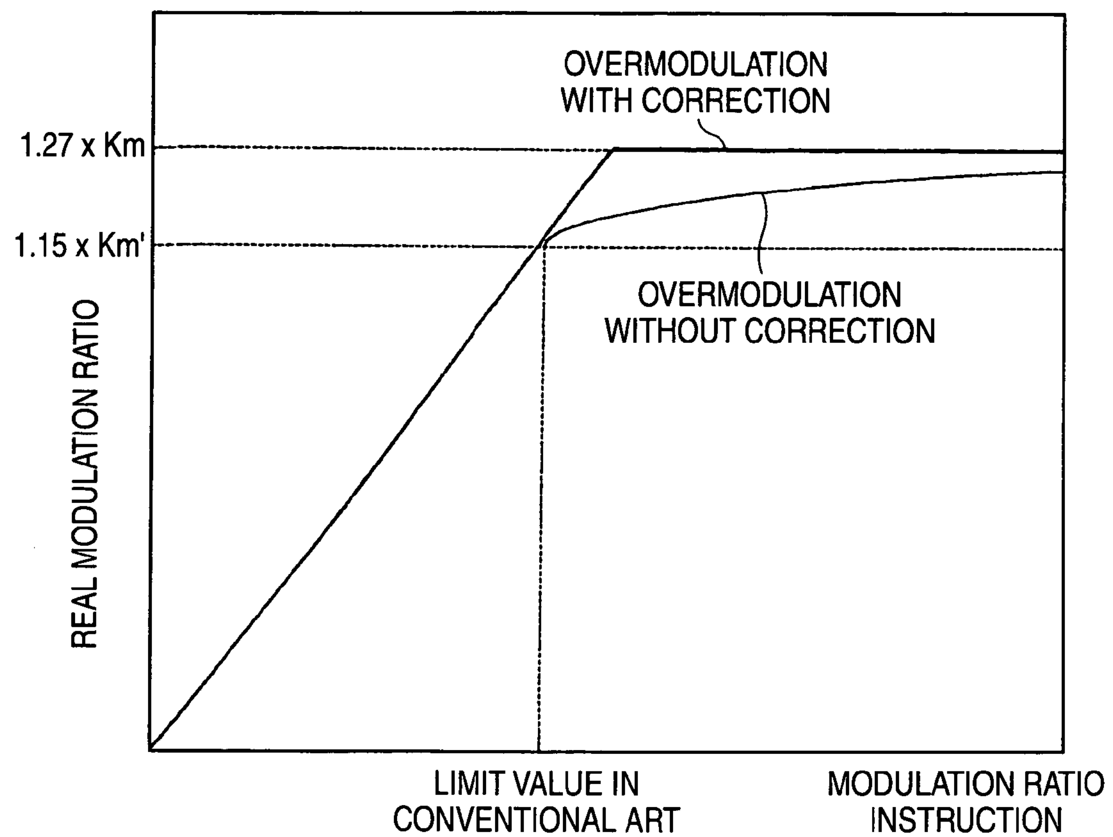
[FIG. 5]

FIG. 5 shows a relation between the modulation ratio instruction and the actual modulation ratio in the cases of the present invention and the conventional arts with and without overmodulation correction.

Now, the invention defined in aspect 4 will be described.

Figure 6:
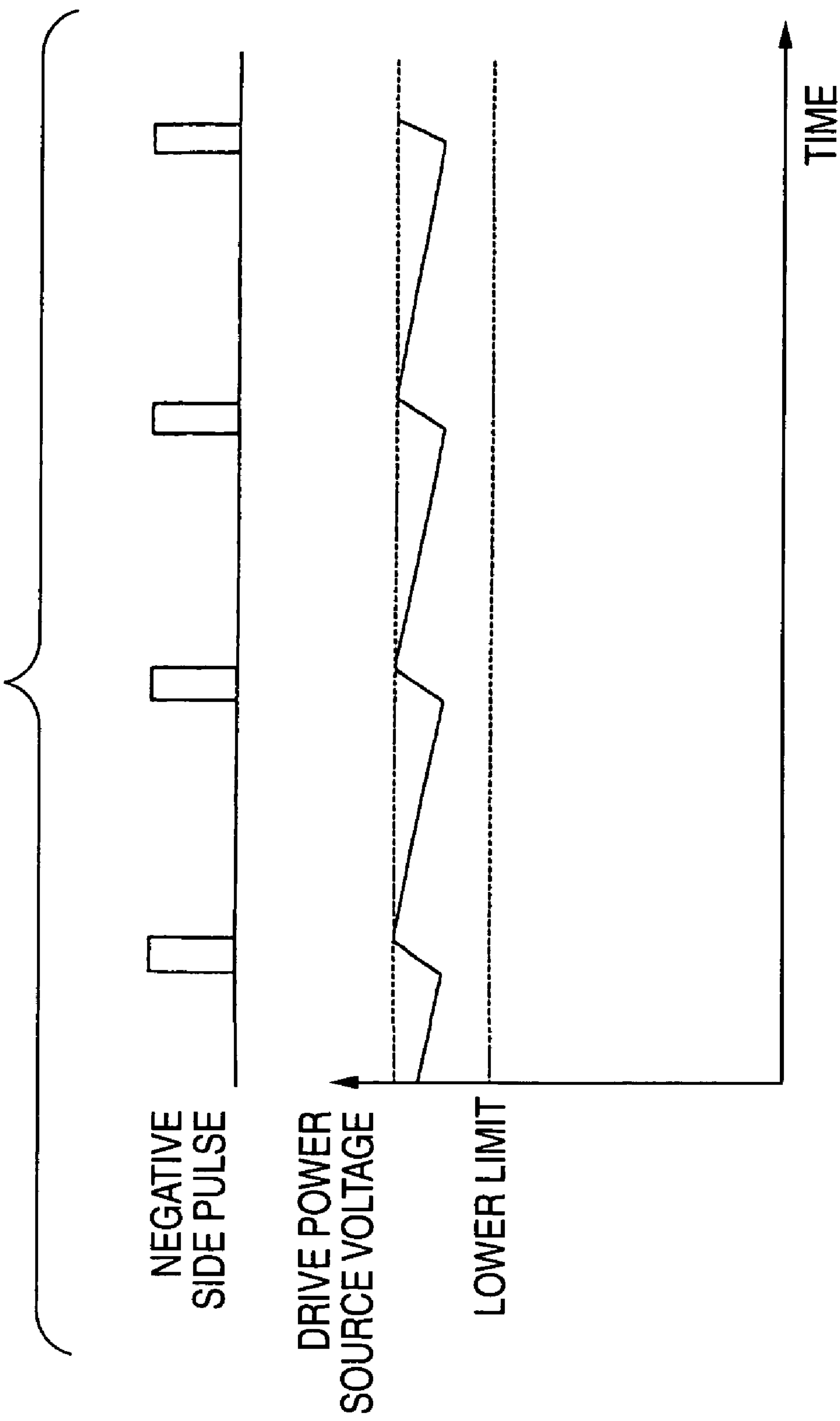
[FIG. 6]
Figure 11:
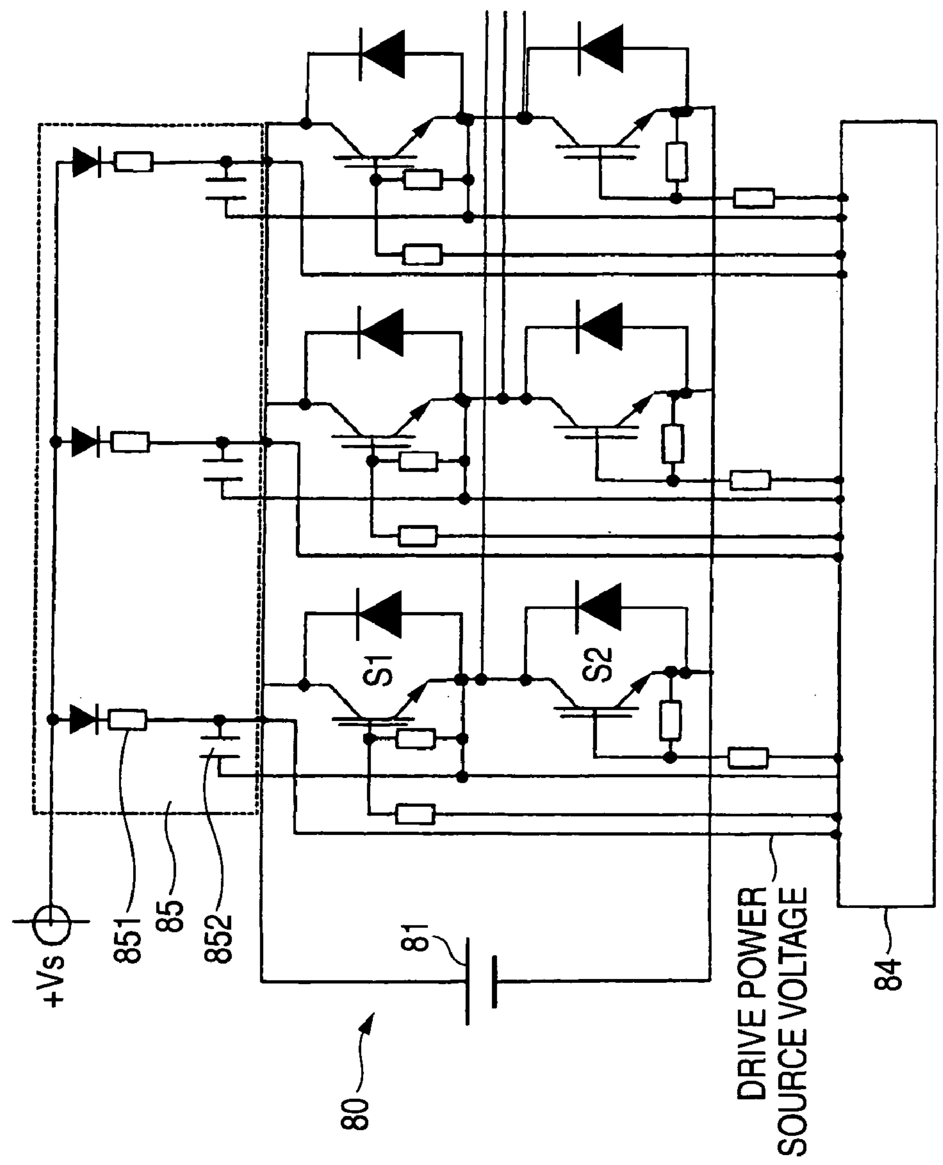
[FIG. 11]

FIG. 6 shows a relation between the drive power source voltage and the negative side pulse width in the case where the drive power source of the switching device is provided by the charge pump circuit shown in FIG. 11.

An amount of charge obtained by the charge pump is increased when the negative side pulse is inputted and is reduced when there is no negative side pulse is inputted.

Therefore, the negative side pulse width at the carrier wave frequency, which is necessary to maintain a voltage high enough to drive the switching device, can be obtained on the basis of the relation between power consumption and amount of charge. It becomes possible to output a voltage higher than that obtainable by the conventional art method by obtaining the upper limit of modulating wave from the pulse width thus obtained under consideration of the dead-time and reliably maintaining the charge pump voltage by applying aspect 1, 2 or 3. Incidentally, the higher the carrier frequency results in the higher the upper limit value of modulation wave.

Now, the invention defined in aspect 5 will be described.

When the upper limit value of modulation wave is not provided, the OFF period of the negative side pulse becomes longest during the 6-step operation in which modulation ratio becomes largest. The minimum output frequency instruction during the 6-step operation is obtained on the basis of a time period T from a time at which the voltage of the charge pump circuit is maximum to a time at which the voltage becomes minimum value necessary to drive the switching device, due to power consumption. The following equation (3) represents the minimum output frequency instruction.

$$Fout = \frac{1}{2T} \quad \text{[Equation 3]}$$

It is possible to eliminate the limitation of voltage output at high frequency by gradually increasing the upper limit of modulation wave by using this equation and making the upper limit value of modulation wave coincident with the maximum value of the carrier when the output frequency is equal to or higher than Fout. However, since there is a switchable minimum pulse width according to the characteristics of the switching device, the upper limit value of modulation wave is changed as shown in FIG. 7 by considering this matter.

Figure 7:
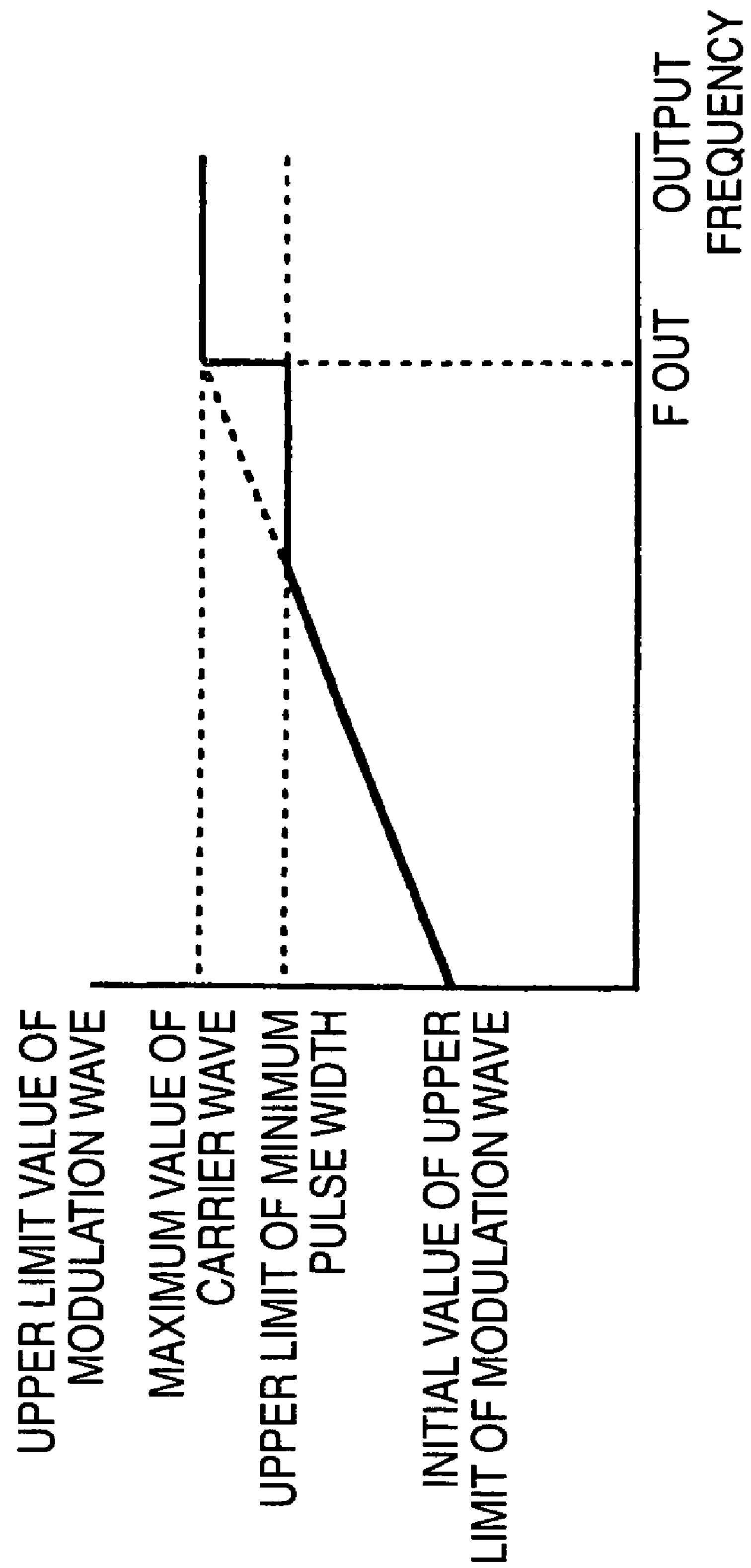
[FIG. 7]

That is, in FIG. 7, the upper limit value of modulation wave is linearly increased with increase of frequency starting from an initial upper limit value at frequency 0 such that, when the upper limit value exceeds the minimum upper limit of pulse width, the upper limit value is limited by the minimum limit of pulse width and, when the frequency becomes equal to or higher than Fout, the upper limit value becomes equal to the maximum value of carrier wave.

Now, the invention defined in aspect 6 will be described.

Figure 8:
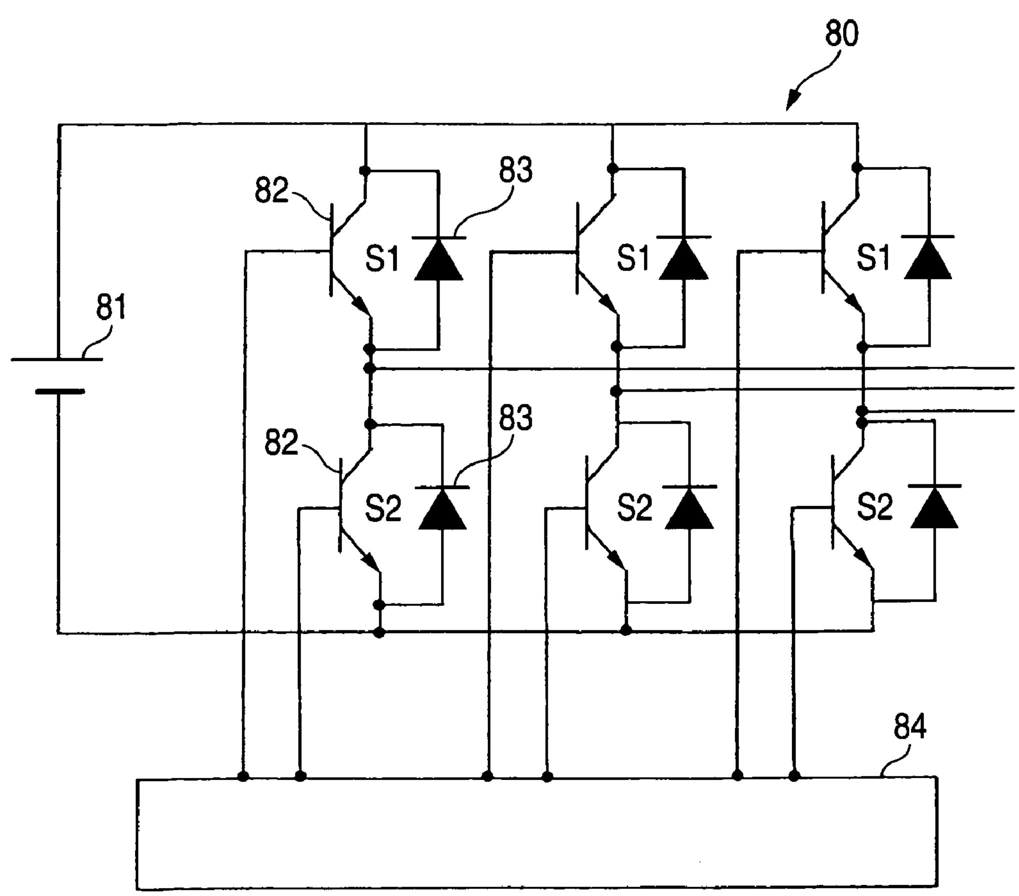
[FIG. 8]
Figure 9:
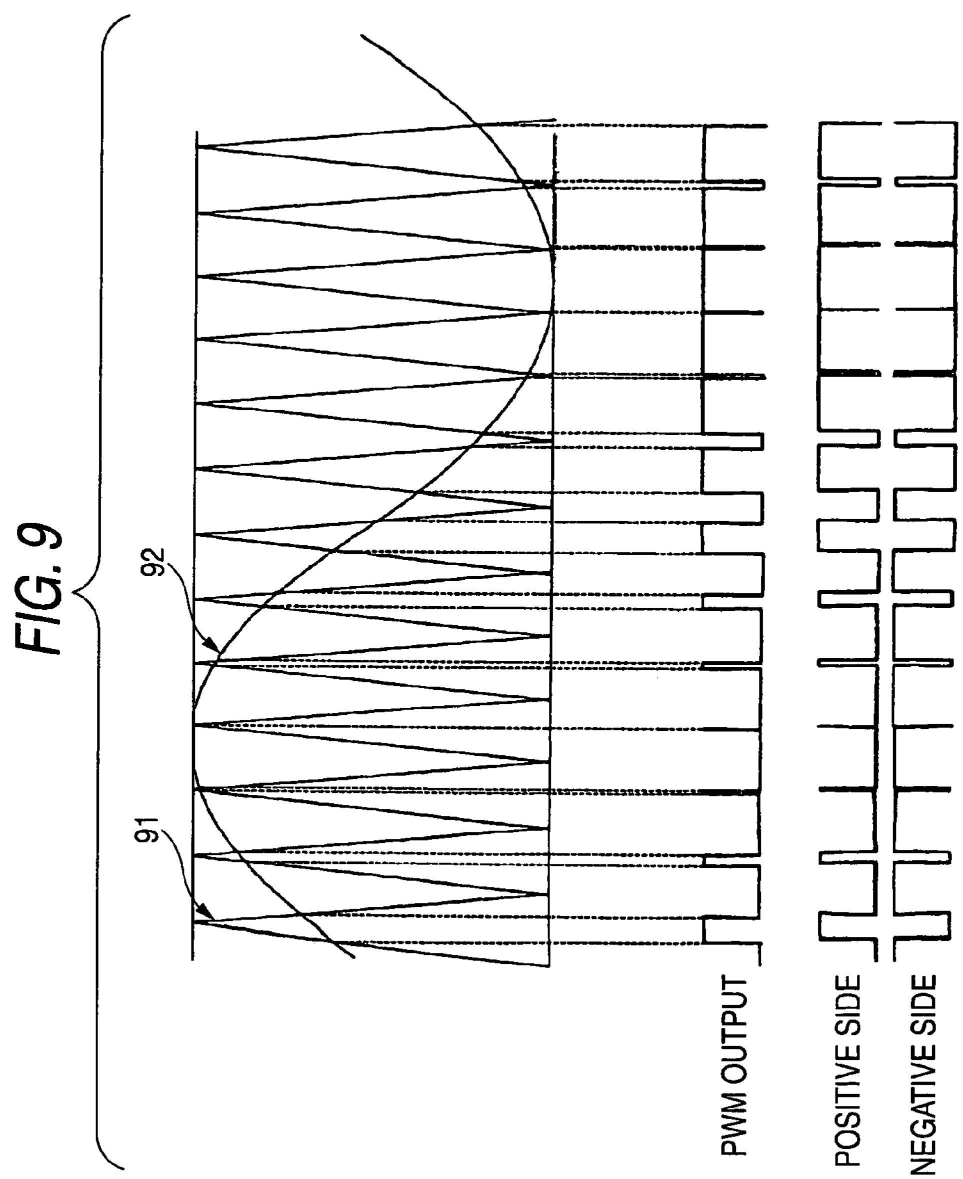
[FIG. 9]
Figure 10:
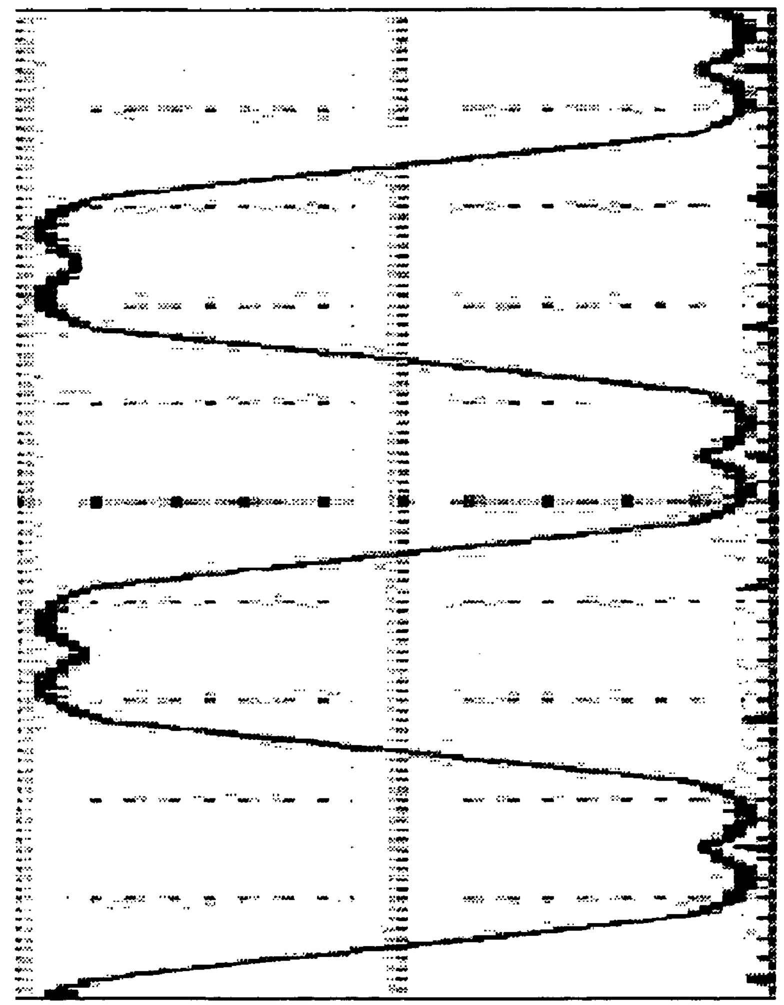
[FIG. 10]
Figure 12:
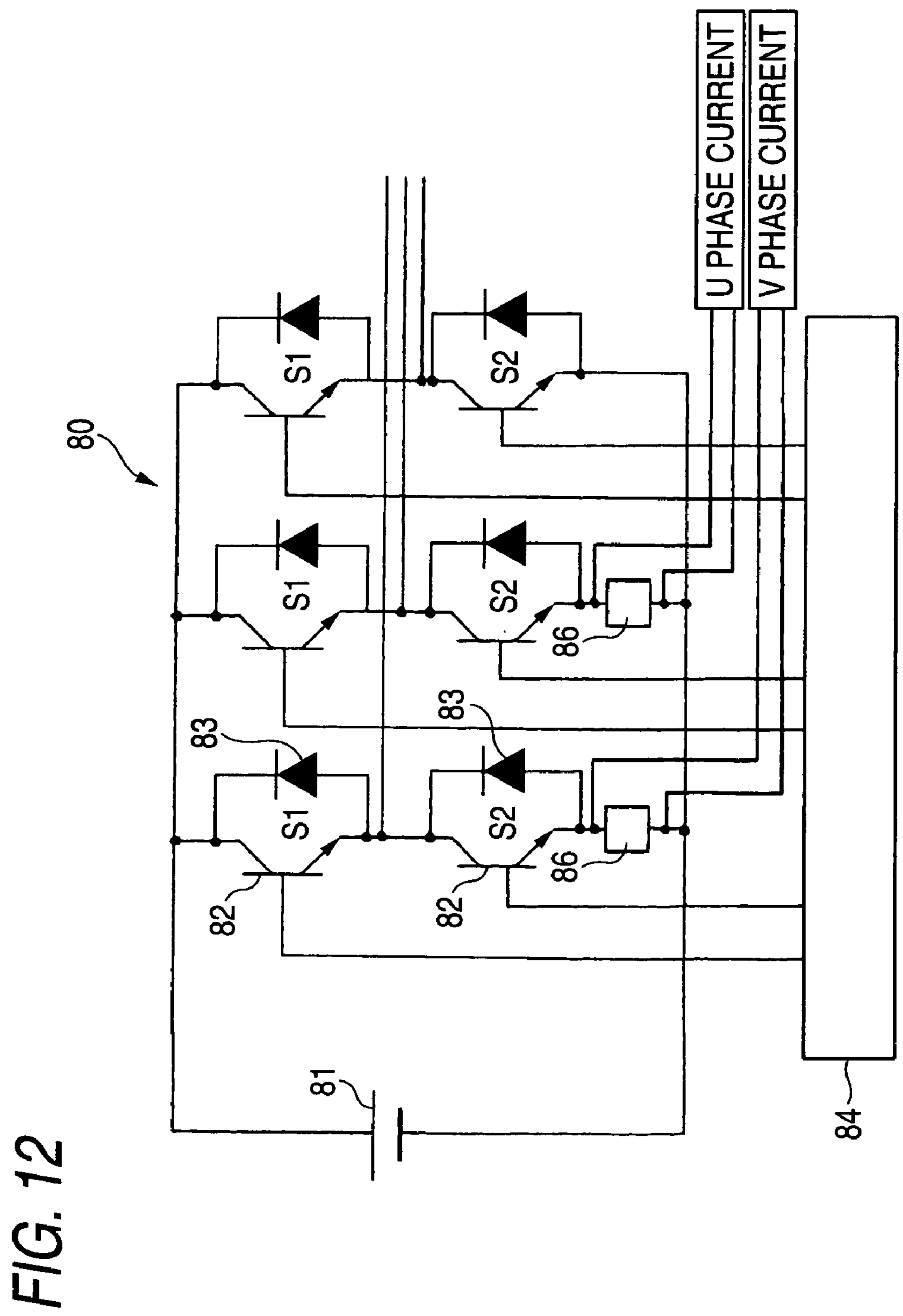
[FIG. 12]

In a case where the output currents in respective phases of the PWM inverter apparatus are detected between the negative side switching devices and the negative side of the D.C. power source as shown in FIG. 12, it is necessary to maintain the pulse width of the negative side switching device for a time period Ti, which is necessary to detect the current. In the case where the carrier wave is the triangular wave shown in FIG. 8, the upper limit value of modulation wave becomes lower than the maximum value of the carrier wave by Ti/2. Incidentally, since this is fixed by only the pulse width, the modulation ratio is limited more severely for the higher the carrier frequency.

Embodiment 2

Figure 13:
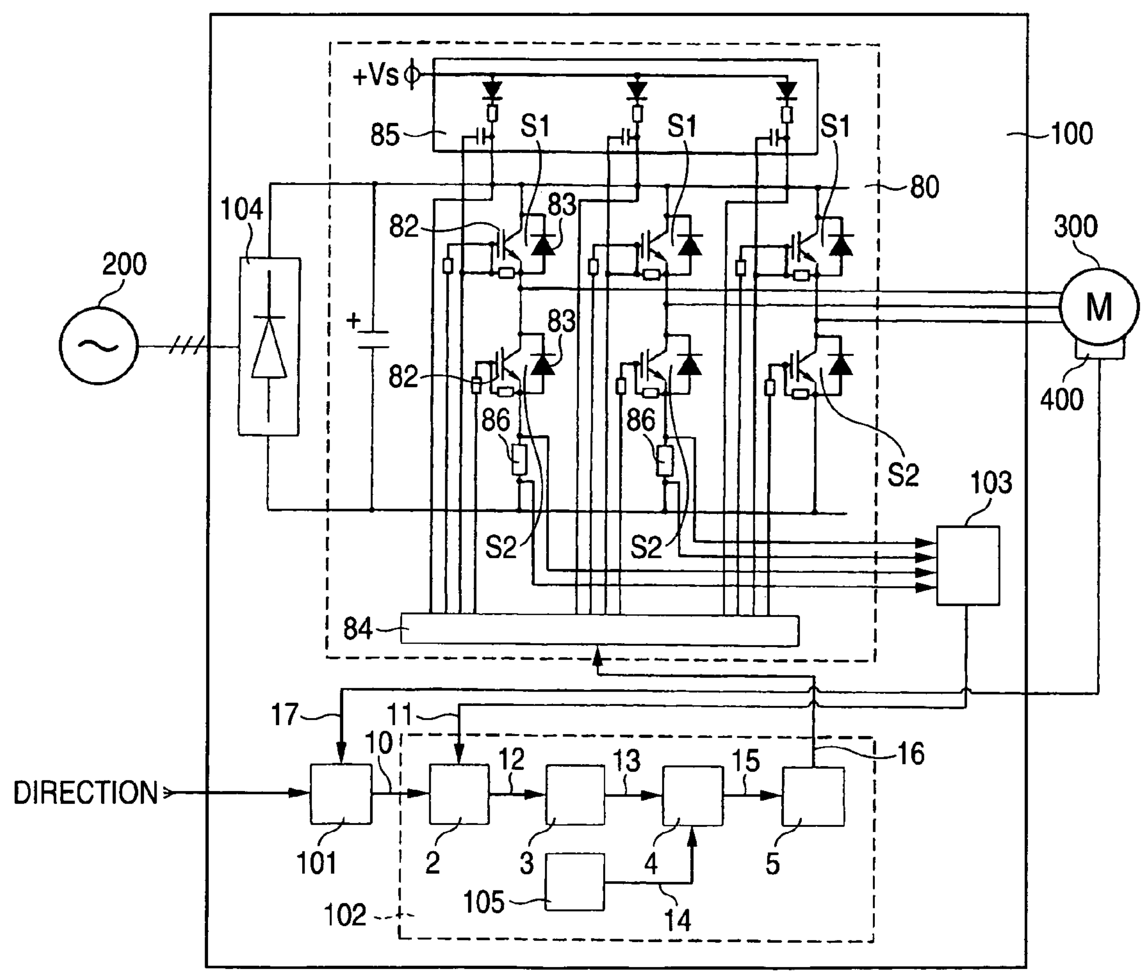
[FIG. 13]

FIG. 13 is a block diagram showing an embodiment of a motor control apparatus according to the present invention.

In FIG. 13, a reference numeral 100 depicts the motor control apparatus, 200 a commercial power source, 300 a motor and 400 an encoder. Further, 101 depicts an upper control unit, 102 a lower control unit, 103 a current detection unit, 104 a converter unit and 105 an upper limit value calculation unit. Incidentally, since those depicted by same reference numerals as those used in the conventional art description and the inventions defined in aspects 1 to 6 operate similarly, detailed description thereof is omitted.

The motor control apparatus 100 is constructed with the converter unit 104, a PWM inverter apparatus 80, the upper control unit 101, the lower control unit 102 and the current detection unit 104. In general, the motor control apparatus 100 includes two constructive components, which are a main circuit portion constructed with the converter unit 104 and the PWM inverter apparatus 80 and a control portion constructed with the upper control unit 101, the lower control unit 102 and the current detection unit 104. Incidentally, a control power source unit, which is not shown, is included in the main circuit portion.

The lower control unit 102 is constructed with a voltage instruction producing unit 2, a modulation wave instruction producing unit 3, a modulation wave control unit 4, a PWM signal generator unit 5 and a modulation wave upper limit value calculation unit 106. Incidentally, the lower control unit 102 includes a carrier wave generator unit, which is not shown.

Now, an operation of the motor control apparatus of the present invention will be described.

The lower control unit 102 generates a PWM signal 16 according to an external operation instruction. In such case, the upper control unit 101 performs a position control, a speed control and a torque control according to a position feedback signal 17, which is a position detection signal in the encoder 400, and the external operation instruction and outputs a current instruction 10 to the lower control unit 102. The current detection unit 103, which detects currents flowing through shunt resistors 86 provided in the main circuit portion by detecting voltages at opposite ends of the respective shunt resistors 86, A/D converts the voltages at the opposite ends and outputs the currents to the lower control unit 102 as a current feedback signal 11. The lower control unit 102 outputs the PWM signal 16 to the main circuit portion according to the previously described method of the present invention, on the basis of the current instruction 10 from the upper control unit 101 and the current feedback signal 11 from the current detection unit 103. The converter unit 104 converts A.C. power of the commercial power source 200 into D.C. power and the PWM inverter apparatus 80 converts the D.C. power into an A.C. power according to the PWM signal 16 from the control unit and supplies power to the motor 300. The motor control apparatus 100 performs a motor control according to the external operation instruction through the series of processing.

Now, the invention defined in aspect 7 will be described.

The present invention differs from the conventional art in that the lower control unit 102 includes the modulation wave control unit 4 and the modulation wave upper limit calculation unit 105. Since the conventional art lower control unit is constructed with the voltage instruction generating unit 2, the modulation wave instruction generation unit 3, the PWM signal generator unit 5 and the carrier wave generator unit 105 and generates the PWM signal 16 by comparison of the modulation wave instruction 13 with the carrier wave and the predetermined limitation of modulation ratio, there are problems of reduction of the maximum value of rotation number due to voltage saturation and limitation of torque at maximum rotation number. By providing the lower control unit 102 including the modulation wave control unit 4 and the modulation wave upper limit calculation unit 105, it is possible to expand the voltage output while maintaining the minimum pulse width of the negative side switching device.

Now, the invention defined in aspects 10 and 11 will be described.

Under the following conditions, the modulation wave upper value calculation unit 105 calculates the upper limit value 14 of modulation wave such that the upper limit value becomes equal to or lower than the maximum value of the carrier wave and equal to or higher than the minimum value of the carrier wave and outputs the upper limit value 14 to the modulation wave control unit 4.

(1) In the case where the drive power source of the charge pump circuit 85 is used, the negative side pulse width at carrier frequency is obtained on the basis of the relation between power consumption and amount of charge to consider the dead-time long enough to drive the switching device. When the negative side pulse width is obtained, the time for which the negative side switching device is in ON state in the basic 3-phase modulation varies periodically at output frequency. Therefore, the prevention of the positive side voltage drop to a value equal to or lower than the minimum voltage by the periodic variation is the condition.

(2) In the case where the output currents of the PWM inverter apparatus 80 are detected between the negative side switching devices of the respective phases and the negative side of the D.C. power source, the maintenance of the necessary time Ti or longer is considered.

(3) In the case where the upper limit value 14 of modulating wave is not fixed, the output frequency is monotonously increased with increase of frequency starting from an initial upper limit value at frequency 0 such that, when the upper limit value exceeds the minimum upper limit of pulse width, the upper limit value is limited by the minimum limit of pulse width, which is the characteristics of the switching device, and, when the frequency becomes equal to or higher than Fout, the upper limit value becomes equal to the maximum value of carrier wave.

Next, the invention defined in aspects 8 and 9 will be described.

The modulation wave control unit 4 corrects the modulation wave instruction 13 from the modulation wave instruction generator unit 3 under the following conditions and outputs the corrected modulation wave instruction 13 to the PWM signal generator unit 5.

(1) The modulation wave instruction 13 is corrected such that it becomes between the upper limit value 14 of modulation wave and the minimum value of the carrier wave.

(2) The modulation wave instruction 13 of each phase is reduced by the difference between the maximum value of the carrier wave and the upper limit value 14 of modulation wave such that the center of amplitude of the modulation wave instruction 13 coincides with the center between the minimum value of the carrier wave and the upper limit value 14 of modulation wave.

(3) The modulation wave instruction 13 is corrected by adding an amendment of it similarly to the overmodulation between the upper limit value 14 of modulation wave and the minimum value of the carrier wave.

Incidentally, although the motor control apparatus according to the embodiment 2 uses the A.C. power from the commercial power source 200, the motor control apparatus similarly operates with a D.C. power source and the corrections and calculations of the upper limit value calculation unit 105 and the modulation wave control unit 4 are similarly performed.

As described, since the present invention can output a large voltage while maintaining the pulse width of the negative side switching device, it is possible to improve the output voltage of the PWM inverter apparatus, which utilizes the charge pump circuit as the drive power source or detects the output current with the negative side switching device and the negative side of the D.C. power source, so that it is possible to reduce the cost of the inverter apparatus while minimizing the degradation of characteristics thereof.

The invention claimed is:

1. A method for generating a modulation wave instruction of the PWM inverter apparatus, which is controlled by a pulse width modulation signal obtained by comparing a modulation wave signal of a voltage instruction with a carrier wave, the method comprising the steps of:

providing an upper limit value of modulation wave, which is equal to or smaller than the maximum value of the carrier wave and larger than the minimum value of the carrier wave; and correcting the modulation wave instructions of a plurality of phases so that the modulation wave instructions become between the minimum value of the carrier wave and the upper limit value of the modulation wave.

2. The method for generating a modulation wave instruction of the PWM inverter apparatus as in claim 1, wherein the modulation wave instructions are corrected to become between the minimum value of the carrier wave and the upper limit value of the modulation wave, after the modulation wave instruction of the plurality of phases is reduced by a difference between the maximum value of the carrier wave and the upper limit value of the modulation wave.

3. The method for generating a modulation wave instruction of the PWM inverter apparatus as in claim 2, wherein the modulation wave instructions of the plurality of phases are corrected so that a difference between the maximum value and the minimum value of the modulation wave instructions coincides with the difference between the minimum value of the carrier wave and the upper limit value of the modulation wave and so that a modulation ratio instruction coincides with an actual modulation ratio until all of the modulation wave instructions of the plurality of phases become the maximum value or the minimum value.

4. The method for generating a modulation wave instruction of the PWM inverter apparatus including a charge pump circuit for charging a capacitor with pulse of a negative side switching device as a drive circuit power source of a switching device, as in claim 1, wherein the upper limit value of the modulation wave is determined so that the pulse width of the negative side switching device at a frequency of the carrier wave becomes a pulse width necessary to maintain an output voltage of the charge pump circuit.

5. The method for generating a modulation wave instruction of the PWM inverter apparatus as in claim 4, wherein the upper limit value of the modulation wave has an initial value, when an output frequency is 0;

increases monotonously from the initial value with increase of the output frequency;

is limited to an upper limit of a minimum pulse width, when it exceeds the upper limit of the minimum pulse width required by a switching device; and is changed so that it coincides with the maximum value of the carrier wave, when the output frequency becomes high.

6. A method for generating a modulation wave instruction of the PWM inverter apparatus as in claim 1, wherein the output phase currents of the plurality of phases are detected between the negative side switching devices and the negative side of the D.C. power source; and the upper limit value of the modulation wave is determined so that the pulse width of the negative side switching device is maintained for a time long enough to detect the currents.

7. A motor control apparatus comprising:

a voltage instruction producing unit for producing a voltage instruction on the basis of a current detection value and a current instruction;

a modulation wave instruction producing unit for producing a modulation wave instruction on the basis of the voltage instruction;

a PWM signal generator unit for generating a PWM signal obtained by comparing the modulation wave instruction with a carrier wave; and a PWM inverter apparatus controlled by the PWM signal;

a modulation wave upper limit value calculation unit for calculating an upper limit value of modulation wave so that the upper limit value of modulation wave becomes equal to or smaller than the maximum value of the carrier wave and larger than the minimum value of the carrier wave; and a modulating wave control unit for correcting the modulation wave instruction to be a value between the upper limit value of modulation wave and the minimum value of the carrier wave.

8. The motor control apparatus as in claim 7, wherein the modulation wave control unit corrects the modulation wave instruction to be a value between the upper limit value of the modulation wave and the minimum value of the carrier wave, after the modulation wave instruction is reduced by a difference between the maximum value of the carrier wave and the upper limit value of the modulation wave.

9. The motor control apparatus as in claim 8, wherein the modulation wave control unit adds an overmodulation correction for making a modulation ratio instruction coincident with an actual modulation ratio to the modulation wave instruction.

10. A motor control apparatus as in claim 7, comprising:

a charge pump circuit for obtaining a power source of a switching device drive circuit of the PWM inverter by charging a capacitor with a pulse of a negative side switching device; and a current detection unit for detecting the output phase currents of the plurality of phases between the negative side switching devices and the negative side of the D.C. power source, wherein the modulating wave upper limit value calculation unit calculates the upper limit value of modulating wave on the basis of a pulse width required for a switching device to be used, a pulse width required for maintaining an output voltage of the charge pump circuit or a pulse width required for current detection.

11. The motor control apparatus as in claim 10, wherein the modulation wave upper limit value calculation unit calculates the upper limit value of modulation wave so that the upper limit value of the modulation wave has an initial value, when an output frequency is 0;

increases monotonously from the initial value with increase of the output frequency;

is limited to an upper limit of a minimum pulse width when it exceeds the upper limit of the minimum pulse width required by a switching device; and is changed so that it coincides with the maximum value of the carrier wave, when the output frequency becomes high.

12. The method for generating a modulation wave instruction of the PWM inverter apparatus including a charge pump circuit for charging a capacitor with pulse of a negative side switching device as a drive circuit power source of a switching device, as in claim 2, wherein the upper limit value of the modulation wave is determined so that the pulse width of the negative side switching device at a frequency of the carrier wave becomes a pulse width necessary to maintain an output voltage of the charge pump circuit.

13. The method for generating a modulation wave instruction of the PWM inverter apparatus including a charge pump circuit for charging a capacitor with pulse of a negative side switching device as a drive circuit power source of a switching device, as in claim 3, wherein the upper limit value of the modulation wave is determined so that the pulse width of the negative side switching device at a frequency of the carrier wave becomes a pulse width necessary to maintain an output voltage of the charge pump circuit.

14. The method for generating a modulation wave instruction of the PWM inverter apparatus as in claim 12, wherein the upper limit value of the modulation wave has an initial value, when an output frequency is 0;

increases monotonously from the initial value with increase of the output frequency;

is limited to an upper limit of a minimum pulse width, when it exceeds the upper limit of the minimum pulse width required by a switching device; and is changed so that it coincides with the maximum value of the carrier wave, when the output frequency becomes high.

15. The method for generating a modulation wave instruction of the PWM inverter apparatus as in claim 13, wherein the upper limit value of the modulation wave has an initial value, when an output frequency is 0;

increases monotonously from the initial value with increase of the output frequency;

is limited to an upper limit of a minimum pulse width, when it exceeds the upper limit of the minimum pulse width required by a switching device; and is changed so that it coincides with the maximum value of the carrier wave, when the output frequency becomes high.

16. A method for generating a modulation wave instruction of the PWM inverter apparatus as in claim 2, wherein the output phase currents of the plurality of phases are detected between the negative side switching devices and the negative side of the D.C. power source; and the upper limit value of the modulation wave is determined so that the pulse width of the negative side switching device is maintained for a time long enough to detect the currents.

17. A method for generating a modulation wave instruction of the PWM inverter apparatus as in claim 3, wherein the output phase currents of the plurality of phases are detected between the negative side switching devices and the negative side of the D.C. power source; and the upper limit value of the modulation wave is determined so that the pulse width of the negative side switching device is maintained for a time long enough to detect the currents.

18. A motor control apparatus as in claim 8, comprising:

a charge pump circuit for obtaining a power source of a switching device drive circuit of the PWM inverter by charging a capacitor with a pulse of a negative side switching device; and a current detection unit for detecting the output phase currents of the plurality of phases between the negative side switching devices and the negative side of the D.C. power source, wherein the modulating wave upper limit value calculation unit calculates the upper limit value of modulating wave on the basis of a pulse width required for a switching device to be used, a pulse width required for maintaining an output voltage of the charge pump circuit or a pulse width required for current detection.

19. A motor control apparatus as in claim 9, comprising:

a charge pump circuit for obtaining a power source of a switching device drive circuit of the PWM inverter by charging a capacitor with a pulse of a negative side switching device; and a current detection unit for detecting the output phase currents of the plurality of phases between the negative side switching devices and the negative side of the D.C. power source, wherein the modulating wave upper limit value calculation unit calculates the upper limit value of modulating wave on the basis of a pulse width required for a switching device to be used, a pulse width required for maintaining an output voltage of the charge pump circuit or a pulse width required for current detection.

20. The motor control apparatus as in claim 18, wherein the modulation wave upper limit value calculation unit calculates the upper limit value of modulation wave so that the upper limit value of the modulation wave has an initial value, when an output frequency is 0;

increases monotonously from the initial value with increase of the output frequency;

is limited to an upper limit of a minimum pulse width when it exceeds the upper limit of the minimum pulse width required by a switching device; and is changed so that it coincides with the maximum value of the carrier wave, when the output frequency becomes high.

21. The motor control apparatus as in claim 19, wherein the modulation wave upper limit value calculation unit calculates the upper limit value of modulation wave so that the upper limit value of the modulation wave has an initial value, when an output frequency is 0;

increases monotonously from the initial value with increase of the output frequency;

is limited to an upper limit of a minimum pulse width when it exceeds the upper limit of the minimum pulse width required by a switching device; and is changed so that it coincides with the maximum value of the carrier wave, when the output frequency becomes high.

* * * * *